US009766806B2

(12) United States Patent
Bennet et al.

(10) Patent No.: US 9,766,806 B2
(45) Date of Patent: Sep. 19, 2017

(54) HOLOGRAPHIC KEYBOARD DISPLAY

(71) Applicant: Microsoft Technology Licensing, LLC, Redmond, WA (US)

(72) Inventors: Rotem Bennet, Ein Karmel (IL); Lewey Geselowitz, Redmond, WA (US); Wei Zhang, Redmond, WA (US); Adam G. Poulos, Sammamish, WA (US); John Bevis, Seattle, WA (US); Kim Pascal Pimmel, Seattle, WA (US); Nicholas Gervase Fajt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 9 days.

(21) Appl. No.: 14/332,334

(22) Filed: Jul. 15, 2014

(65) Prior Publication Data
US 2016/0018985 A1    Jan. 21, 2016

(51) Int. Cl.
*G06F 3/0488*  (2013.01)
*G03H 1/06*  (2006.01)
(Continued)

(52) U.S. Cl.
CPC ..... *G06F 3/04886* (2013.01); *G02B 27/0172* (2013.01); *G03H 1/0005* (2013.01);
(Continued)

(58) Field of Classification Search
CPC . G06F 3/04886; G06F 1/1673; G03H 1/0891; G03H 1/0005; G03H 2001/0061;
(Continued)

(56) References Cited

U.S. PATENT DOCUMENTS 5,767,842 A    6/1998  Korth
5,912,658 A    6/1999  Bergamasco et al.
(Continued)

FOREIGN PATENT DOCUMENTS

WO    0229711 A2    4/2002
WO    2010042880 A2    4/2010
(Continued)

OTHER PUBLICATIONS

Silbert, Sarah., "Apple patent application details method for detecting and displaying hand position on screen", Retrieved at >>http://www.engadget.com/2012/09/06/apple-patent-method-detect-display-hand-position/>>, Sep. 6, 2012, pp. 7.
(Continued)

*Primary Examiner* — Jimmy H Nguyen
*Assistant Examiner* — Yaron Cohen
(74) *Attorney, Agent, or Firm* — Alleman Hall Creasman & Tuttle LLP

(57) ABSTRACT

Embodiments that relate to displaying holographic keyboard and hand images in a holographic environment are provided. In one embodiment depth information of an actual position of a user's hand is received. Using the depth information, a holographic hand image representing the user's hand is displayed in a virtual hand plane in the holographic environment. In response to receiving a keyboard activation input from the user and using the depth information, the holographic keyboard image is adaptively displayed in a virtual keyboard plane in the holographic environment at a virtual distance under the holographic hand image representing the user's hand.

19 Claims, 11 Drawing Sheets

(51) Int. Cl.
| | |
|---|---|
| G06F 1/16 | (2006.01) |
| G06K 9/00 | (2006.01) |
| G06T 7/00 | (2017.01) |
| G03H 1/00 | (2006.01) |
| G02B 27/01 | (2006.01) |
| G03H 1/22 | (2006.01) |
| G06F 3/01 | (2006.01) |
| G06F 3/03 | (2006.01) |
| G06F 3/0481 | (2013.01) |
| G06T 19/00 | (2011.01) |
| G09G 3/00 | (2006.01) |

(52) U.S. Cl.
CPC ......... *G03H 1/2249* (2013.01); *G06F 1/1673* (2013.01); *G06F 3/011* (2013.01); *G06F 3/013* (2013.01); *G06F 3/017* (2013.01); *G06F 3/0304* (2013.01); *G06F 3/04815* (2013.01); *G06K 9/00375* (2013.01); *G06T 19/006* (2013.01); *G09G 3/002* (2013.01); *G09G 3/003* (2013.01); *G02B 2027/0178* (2013.01); *G03H 1/2294* (2013.01); *G03H 2001/0061* (2013.01); *G03H 2001/2284* (2013.01); *G03H 2226/05* (2013.01); *G03H 2227/02* (2013.01); *G06F 1/163* (2013.01); *G06F 1/1605* (2013.01); *G09G 2370/24* (2013.01)

(58) Field of Classification Search
CPC ........ G02B 27/0172; G02B 2027/0178; G06K 9/00375; G06T 7/0051
See application file for complete search history.

(56) References Cited

U.S. PATENT DOCUMENTS

| | | | |
|---|---|---|---|
| 6,614,422 | B1 | 9/2003 | Rafii et al. |
| 8,311,370 | B2 | 11/2012 | Ha et al. |
| 8,619,049 | B2 | 12/2013 | Harrison et al. |
| 2004/0095315 | A1* | 5/2004 | Montellese ........... G03H 1/0005 345/156 |
| 2008/0297535 | A1 | 12/2008 | Reinig |
| 2010/0177035 | A1* | 7/2010 | Schowengerdt ........ G06F 1/163 345/156 |
| 2010/0306716 | A1 | 12/2010 | Perez |
| 2011/0154249 | A1 | 6/2011 | Jang et al. |
| 2011/0248941 | A1* | 10/2011 | Abdo ................... G06F 3/0488 345/173 |
| 2012/0086645 | A1* | 4/2012 | Zheng .................... G06F 3/013 345/168 |
| 2012/0227006 | A1* | 9/2012 | Amm ..................... G06F 1/169 715/773 |
| 2012/0268376 | A1 | 10/2012 | Bi |
| 2013/0082928 | A1 | 4/2013 | Kim et al. |
| 2013/0265219 | A1 | 10/2013 | Sato |
| 2014/0040810 | A1* | 2/2014 | Haliburton ............ G06F 3/017 715/773 |
| 2014/0071163 | A1 | 3/2014 | Kinnebrew et al. |
| 2014/0152558 | A1 | 6/2014 | Salter et al. |

FOREIGN PATENT DOCUMENTS

| | | |
|---|---|---|
| WO | 2012144666 A1 | 10/2012 |
| WO | 2013038293 A1 | 3/2013 |

OTHER PUBLICATIONS

Rodrigues, et al., "A Virtual Touch Interaction Device for Immersive Applications-", Retrieved at http://www.tecgraf.puc-rio.br/~abraposo/pubs/IJVR/vGlove_IJVR2011.pdf>>, The International Journal of Virtual Reality, 2011, pp. 10.

Werkhoven, et al., "Interactive Virtual Environments Adaptation to virtual hand position-", Retrieved at <<http://www.dtic.mil/cgi-bin/GetTRDoc?AD=ADA326392>>, Technical Report, Human Factors Research Inst Tno Soesterberg, Netherlands, Apr. 16, 1997, pp. 39.

Malik, Shahzad., "An Exploration of Multi-Finger Interaction on Multi-Touch Surfaces-", Retrieved at http://www.cs.utoronto.ca/~smalik/downloads/malik_2007_thesis_multi_finger_final.pdf>>, Doctoral dissertation, University of Toronto, Sep. 6, 2012, pp. 184.

Keetels, M. et al., "Exposure to Delayed Visual Feedback of the Hand Changes Motor-Sensory Synchrony Perception," Experimental Brain Research, vol. 219, Issue 4, pp. 431-440, Jun. 2012, 10 pages.

Teather, R. et al., "Exaggerated Head Motions for Game Viewpoint Control," FuturePlay 2008, Nov. 2008, 4 pages.

Bennet, Rotem et al., "Virtual Interaction With Image Projection" U.S. Appl. No. 13/746,226, filed Jan. 21, 2013, 59 pages.

ISA European Patent Office, International Search Report and Written Opinion Issued in Application No. PCT/US2015/039630, Sep. 22, 2015, WIPO, 13 pages.

IPEA European Patent Office, Second Written Opinion Issued in Application No. PCT/US2015/039630, Apr. 20, 2016, WIPO, 8 Pages.

* cited by examiner

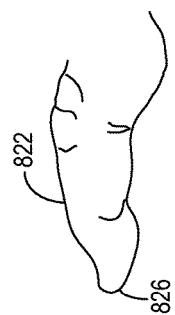
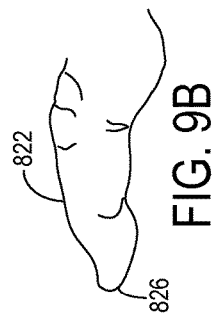
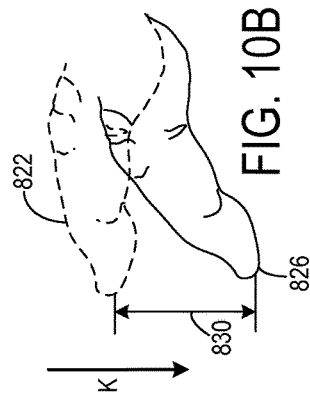
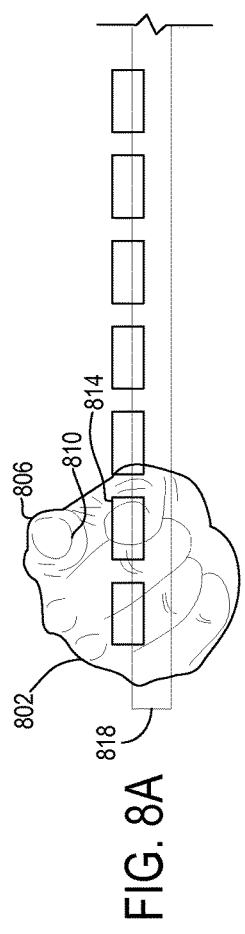
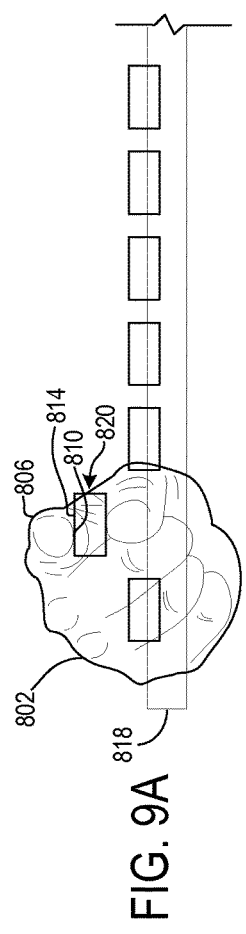
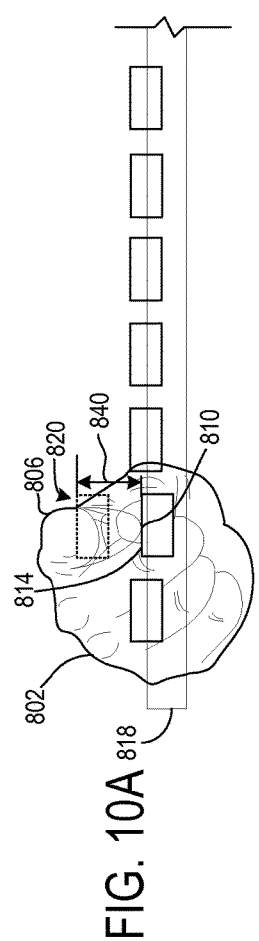

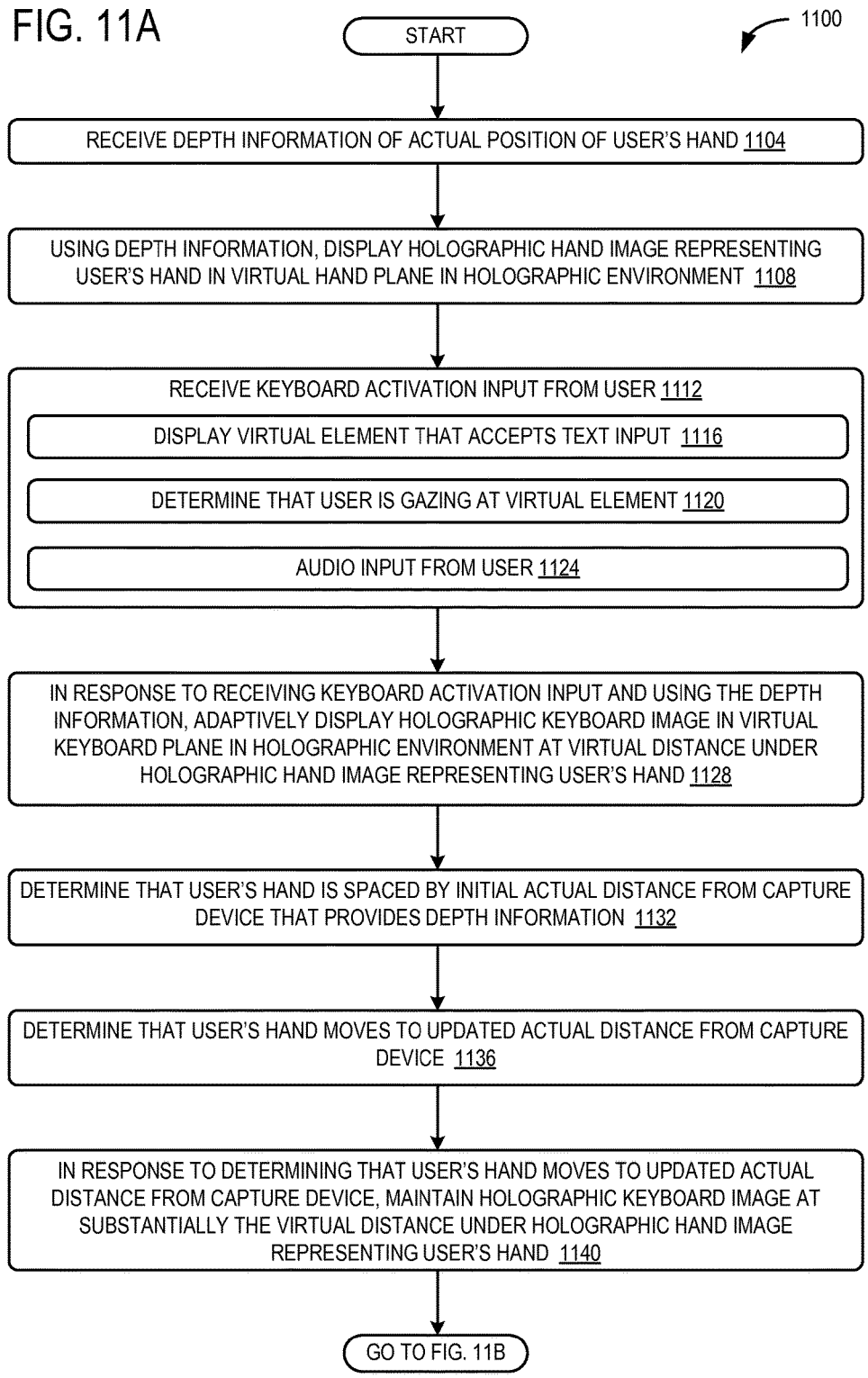

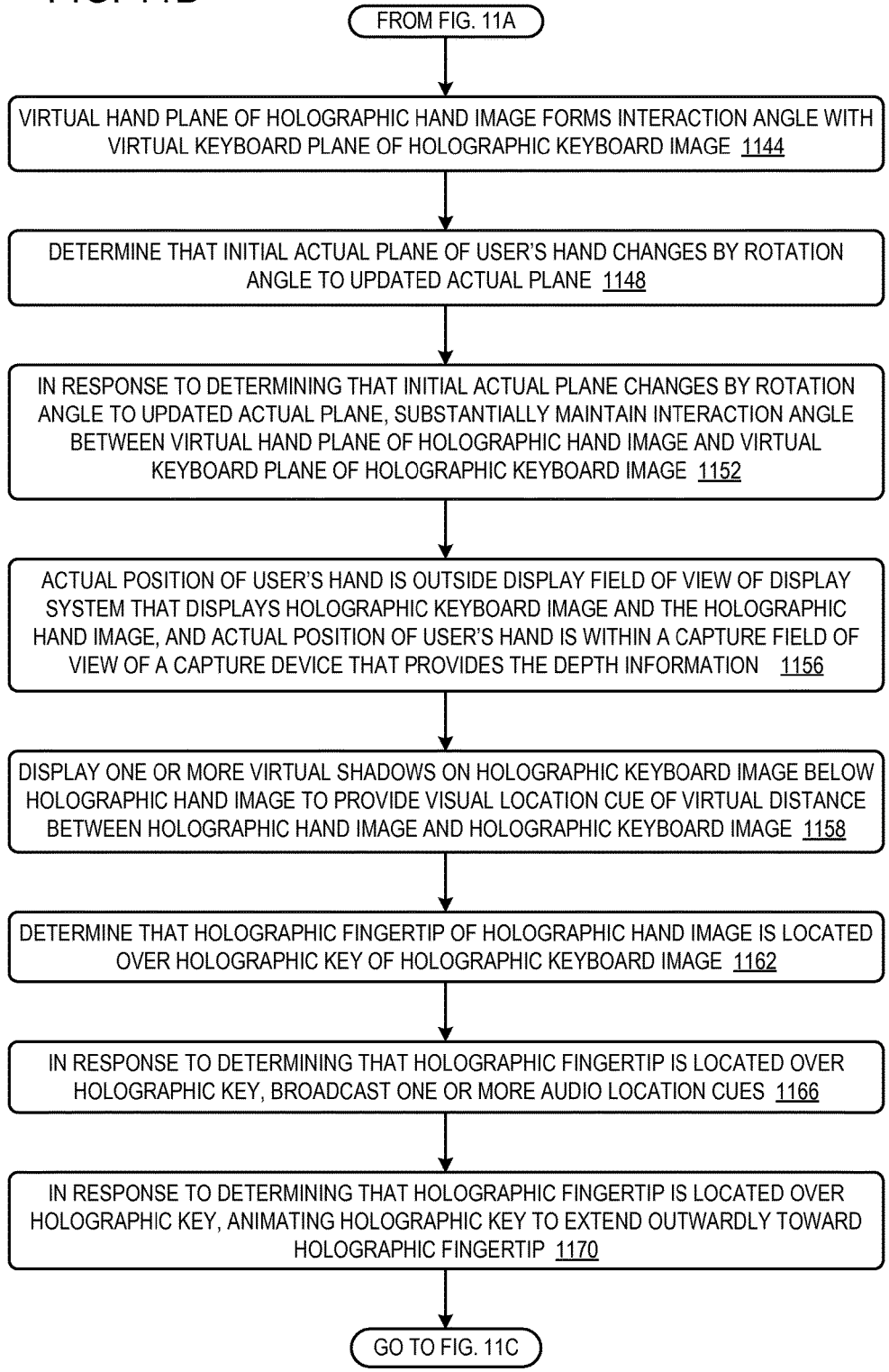

HOLOGRAPHIC KEYBOARD DISPLAY

BACKGROUND

In some virtual reality and mixed reality display systems, it may be desirable to enable users to provide text input using a holographic keyboard. For example, a display system may generate a keyboard hologram that may receive input from a virtual input device controlled by a user. In some examples, the virtual input device may be a hand hologram that may simulate movement of a user's hand or hands to select keys on the holographic keyboard.

However, generating such a holographic keyboard-hand interface that provides an immersive and realistic touch-like interaction has proven challenging. For example, while interacting with a keyboard hologram, the user may move or change positions, or the user's hand(s) may drift inadvertently. This can result in unintentional misalignment between the hand hologram and the keyboard hologram, and can interrupt and degrade an otherwise immersive and realistic user interaction experience. Further, such hand drift and corresponding misalignment can cause false selection determinations in which the system incorrectly interprets a user's hand movement as a selection of a virtual key of the keyboard hologram. Additionally, depending upon the position of the keyboard hologram relative to the user, the user may be forced to move his or her body and/or hand(s) to an unnatural or uncomfortably fixed position to appropriately locate the hand hologram adjacent to the keyboard hologram.

SUMMARY

Various embodiments are disclosed herein that relate to displaying a holographic keyboard image and a holographic hand image representing a user's hand in a holographic environment. For example, one disclosed embodiment provides a method that includes receiving depth information of an actual position of the user's hand. Using the depth information, the holographic hand image representing the user's hand is displayed in a virtual hand plane in the holographic environment. A keyboard activation input is received from the user. In response to receiving the keyboard activation input, and using the depth information of the actual position of the user's hand, the holographic keyboard image is adaptively displayed in a virtual keyboard plane in the holographic environment at a virtual distance under the holographic hand image representing the user's hand.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A is a schematic end view of a holographic hand with a fingertip of an index finger located over a holographic key of a holographic keyboard image according to an embodiment of the present disclosure.

FIG. 8B a schematic partial side view of a user's index finger and fingertip that correspond to the holographic fingertip and index finger of FIG. 8A.

FIG. 9A is a schematic end view of the holographic fingertip and holographic keyboard image of FIG. 8A showing the holographic key extended outwardly toward the holographic fingertip according to an embodiment of the present disclosure.

FIG. 9B a schematic partial side view of the user's index finger and fingertip that correspond to the holographic fingertip and index finger of FIG. 9A.

FIG. 10A is a schematic end view of the holographic fingertip and holographic keyboard image of FIG. 9A showing the holographic fingertip and holographic key moving toward the holographic keyboard by a virtual key-press distance according to an embodiment of the present disclosure.

FIG. 10B is a schematic partial side view showing the user's index finger and fingertip corresponding to the holographic fingertip and index finger of FIG. 10A and moving in a key-press by an actual key-press distance according to an embodiment of the present disclosure.

FIGS. 11A, 11B and 11C are a flow chart of a method for displaying a holographic keyboard image and a holographic hand image according to an embodiment of the present disclosure.

DETAILED DESCRIPTION

Figure 1:
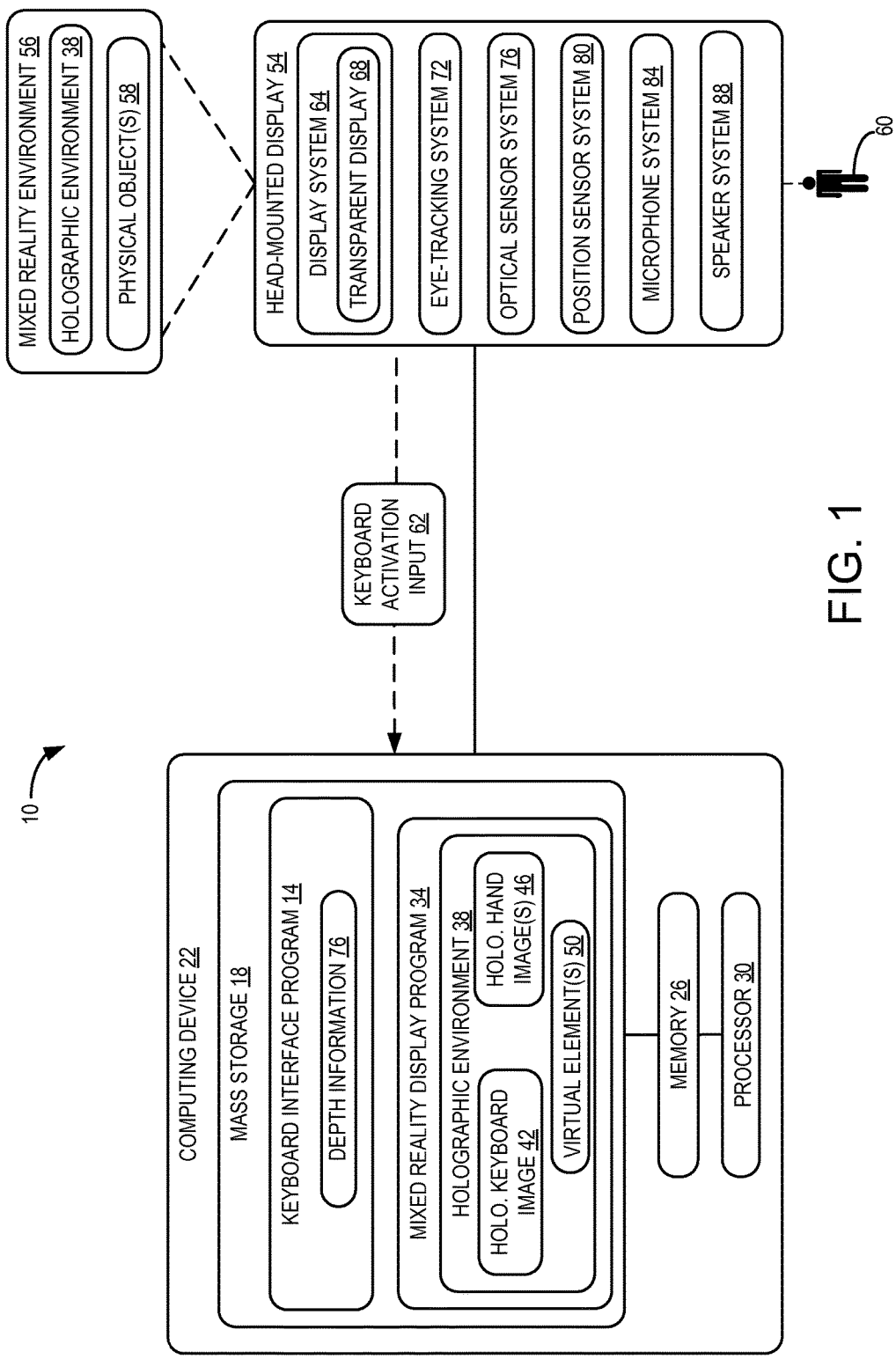
FIG. 1 is a schematic view of a keyboard interface system according to an embodiment of the present disclosure.

FIG. 1 shows a schematic view of one embodiment of a keyboard interface system 10 according to the present disclosure. The keyboard interface system 10 includes a keyboard interface program 14 that may be stored in mass storage 18 of a computing device 22. The keyboard interface program 14 may be loaded into memory 26 and executed by a processor 30 of the computing device 22 to perform one or more of the methods and processes described in more detail below.

In some examples a mixed reality display program 34 may generate a holographic environment 38 that includes a holographic keyboard image 42, one or two holographic hand images 46 and one or more virtual elements 50. Such holographic environment 38 may be provided to a display device, such as the head-mounted display (HMD) device 54 or other display device. As explained in more detail below, the HMD device 54 may provide a virtual environment in the form of a mixed reality environment 56 that includes the holographic environment 38 and one or more physical objects 58 in the surrounding real-world environment that are viewable by a user 60 wearing the HMD device. Alternatively expressed, the mixed reality environment 56 may comprise the holographic environment 38 and a physical environment that are both viewable by the user 60 via the HMD device.

In other examples, an HMD device may create a virtual environment in the form of a virtual reality experience in which only holographic and/or other virtual images are generated and displayed to a user. It will also be appreciated that many other types and configurations of display devices utilizing various display technologies and having various form factors may also be used within the scope of the present disclosure. Such display devices may include, but are not limited to, fixed-position monitors, mobile devices such as smart phones, tablet computers, and notebook computers, projection display devices, three-dimensional (3D) televisions, and other types of display devices.

The computing device 22 may take the form of a desktop computing device, a mobile computing device such as a smart phone, laptop, notebook or tablet computer, network computer, set-top box, home entertainment computer, interactive television, gaming system, or other suitable type of computing device. Additional details regarding the components and computing aspects of the computing device 22 are described in more detail below with reference to FIG. 12.

The computing device 22 may be operatively connected with the HMD device 54 using a wired connection, or may employ a wireless connection via WiFi, Bluetooth, or any other suitable wireless communication protocol. As described in more detail below, the computing device 22 may also receive keyboard activation input 62 from user 60 via the HMD device 54. Additionally, the example illustrated in FIG. 1 shows the computing device 22 as a separate component from the HMD device 54. It will be appreciated that in other examples the computing device 22 may be integrated into the HMD device 54, or located in a common enclosure with other types of displays.

Figure 2:
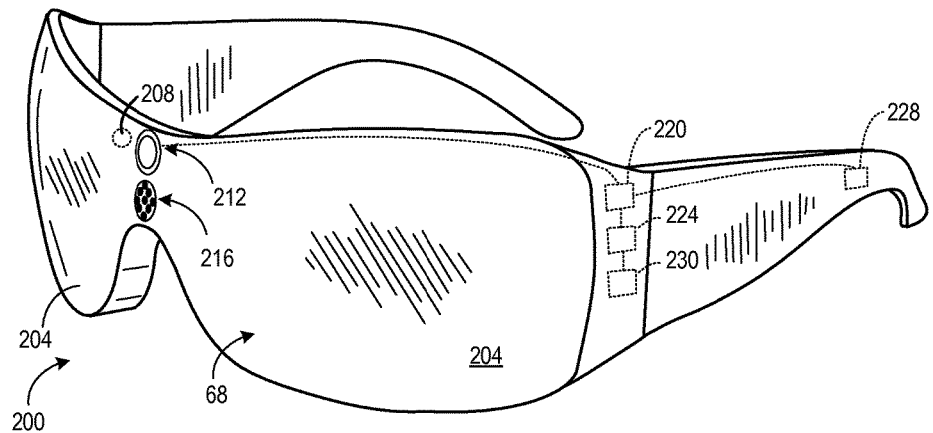
FIG. 2 shows an example head-mounted display device according to an embodiment of the present disclosure.

With reference now also to FIG. 2, one example of an HMD device 54 in the form of a pair of wearable glasses 200 with a transparent display 68 is provided. It will be appreciated that in other examples, the HMD device 54 may take other suitable forms in which a transparent, semi-transparent or non-transparent display is supported in front of a viewer's eye or eyes. It will also be appreciated that the HMD device 54 shown in FIG. 1 may take the form of the HMD device 200, as described in more detail below, or any other suitable HMD device.

With reference to FIGS. 1 and 2, in this example the HMD device 54 includes a display system 64 and transparent display 68 that enables images to be delivered to the eyes of a user. The transparent display 68 may be configured to visually augment an appearance of a physical environment to a user viewing the physical environment through the transparent display. For example, the appearance of the physical environment may be augmented by graphical content (e.g., one or more pixels each having a respective color and brightness) that is presented via the transparent display 68 to create a mixed reality environment 56.

The transparent display 68 may also be configured to enable a user to view a physical object 58 in the physical environment through one or more partially transparent pixels that are displaying a virtual object representation. In one example, the transparent display 68 may include image-producing elements located within lenses 204 (such as, for example, a see-through Organic Light-Emitting Diode (OLED) display). As another example, the transparent display 68 may include a light modulator on an edge of the lenses 204. In this example the lenses 204 may serve as a light guide for delivering light from the light modulator to the eyes of a user. Such a light guide may enable a user to perceive a 3D holographic image located within the physical environment that the user is viewing, while also allowing the user to view physical objects in the physical environment.

The HMD device 54 may also include various sensors and related systems. For example, the HMD device 54 may include an eye-tracking sensor system 72 that utilizes at least one inward facing sensor 208. The inward facing sensor 208 may be an image sensor that is configured to acquire image data in the form of eye-tracking information from a user's eyes. Provided the user has consented to the acquisition and use of this information, the eye-tracking sensor system 72 may use this information to track a position and/or movement of the user's eyes.

In one example, the eye-tracking system 72 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the eye-tracking sensor system 72 may then determine a direction and/or at what physical object or virtual object the user is gazing. Such gaze detection data may then be provided to the keyboard interface program 14. It will be understood that the gaze detection subsystem may have any suitable number and arrangement of light sources and image sensors.

The HMD device 54 may also include sensor systems that receive physical environment data from the physical environment. For example, the HMD device 54 may include an optical sensor system 76 that utilizes at least one outward facing sensor 212, such as an optical sensor. Outward facing sensor 212 may capture images and depth information from objects within its field of view, such as gesture-based inputs or other movements performed by a wearer or by a person or physical object within the field of view.

The outward facing sensor(s) 212 may also capture 2D image information and depth information from the physical environment and physical objects within the environment. In some examples, outward facing sensor 212 may include a depth camera, a visible light camera such as an RGB camera, an infrared light camera, and/or a position tracking camera. In one example and as described in more detail below, the outward facing sensor 212 may include a field of view enabling the sensor to capture images and depth information from a user's hand when hanging downwardly next to the user's leg.

In one example, one or more depth cameras may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 216. It will be appreciated that any other suitable depth camera may be used within the scope of the present disclosure.

Outward facing sensor 212 may also capture images of physical environment in which a user is situated. In one example, the mixed reality display program 34 may include a 3D modeling system that uses such images and depth information to generate holographic environment 38 that models the physical environment data that is captured.

The HMD device 54 may also include a position sensor system 80 that utilizes one or more motion sensors 220 to enable position tracking and/or orientation sensing of the HMD device. For example, the position sensor system 80 may be utilized to determine a head pose orientation of a user's head. In one example, position sensor system 80 may comprise an inertial measurement unit (IMU) configured as a six-axis or six-degree of freedom position sensor system. This example position sensor system may, for example, include three accelerometers and three gyroscopes to indicate or measure a change in location of the HMD device 54 within three-dimensional space along three orthogonal axes (e.g., x, y, z), and a change in an orientation of the HMD device about the three orthogonal axes (e.g., roll, pitch, yaw).

In some embodiments, the outward facing sensor 212 may cooperate with the IMU to determine the location and the orientation of the HMD device 200 in six degrees of freedom. Such location and orientation information may be used to display, via the transparent display 68, one or more virtual objects with a world-locked position in which a position of each virtual object appears to be fixed relative to real-world objects viewable through the transparent display, and the position of each virtual object appears to be moveable relative to a wearer of the see-through display.

Position sensor system 80 may also support other suitable positioning techniques, such as GPS or other global navigation systems. Further, while specific examples of position sensor systems have been described, it will be appreciated that other suitable position sensor systems may be used.

In some examples, motion sensors 220 may also be employed as user input devices, such that a user may interact with the HMD device 54 via gestures of the neck and head, or even of the body. The HMD device 54 may also include a microphone system 84 that includes one or more microphones 224. In other examples, audio may be presented to the user via a speaker system 88 including one or more speakers 228 on the HMD device 54.

The HMD device 54 may also include a processor 230 having a logic subsystem and a storage subsystem, as discussed in more detail below with respect to FIG. 12, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 68.

It will be appreciated that the HMD device 54 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 54 may include additional and/or alternative sensors, cameras, microphones, input devices, output devices, etc. without departing from the scope of this disclosure. Further, the physical configuration of the HMD device 54 and its various sensors and subcomponents may take a variety of different forms without departing from the scope of this disclosure.

Figure 3:
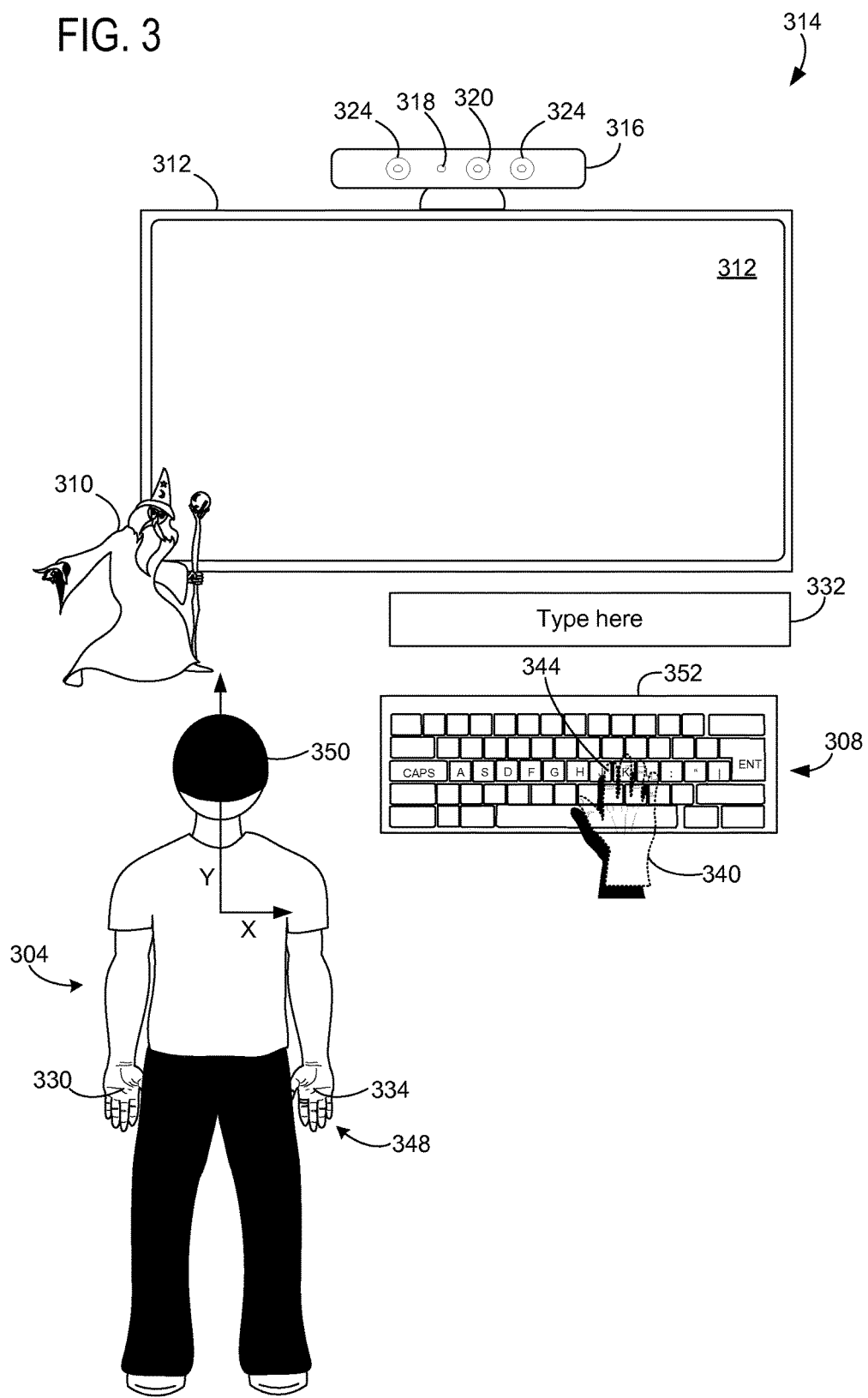
FIG. 3 is a schematic view of a user interacting with a holographic keyboard image displayed via a display device according to an embodiment of the present disclosure.

With reference now to FIGS. 3-7, descriptions of example use cases and embodiments of the keyboard interface system 10 and various display devices will now be provided. FIG. 3 is a schematic illustration of one example of a user 304 interacting with a holographic keyboard image 308 and viewing a holographic wizard image 310 that are displayed by a television 312 in a room 314. In some examples the holographic keyboard image 308 and/or holographic wizard 310 may be displayed in a world-lock display mode as floating stationary in space between user 304 and the television 312. In this manner, as user 304 changes his position in the room 314, the user perceives the world-locked images as remaining stationary with respect to the television 312 and other real-world objects in room 314. In some examples user 304 may wear glasses (not shown) that assist in creating an augmented reality experience by, for example, fusing two images into a single 3D holographic image that is perceived by the user to float in space.

In this example, television 312 is communicatively coupled to a set-top box 316 that comprises a microphone 318, RGB camera 320 and depth sensing cameras 324 facing the user 304. The RGB camera 320 and depth sensing cameras 324 may have a field of view that captures the full body of the user 304. Set-top box 316 may also include an eye tracking system 72 and a computing device 22 that includes keyboard interface program 14. Using data from the depth sensing cameras 324, the set-top box 316 may monitor the position of user 304 and various body parts, such as his left hand 330 and right hand 334. Using gaze tracking data from the eye tracking system 72, the set-top box 316 may also monitor the user's gaze location with respect to real-world objects and holographic images displayed within the room 314.

In some examples, user 304 may desire to selectively view and interact with the holographic keyboard image 308. For example, where user 304 is playing an interactive game that includes holographic wizard 310, the holographic keyboard image 308 normally may not be displayed. To cause the keyboard interface program 14 to display the holographic keyboard image 308, the user may provide keyboard activation input 62 to the keyboard interface program 14 via the set-top box 316.

In some examples, keyboard activation input 62 may comprise audio input provided by user 304, such as a spoken command ("Show keyboard", for example). In other examples, the keyboard activation input 62 may comprise a gesture or other triggering movement performed by the user 304. For example, the keyboard activation input 62 may comprise the user 304 performing a pinch gesture with one of his hands by touching the tip of his index finger to his thumb. In other examples, image data of the user's hand may be analyzed to determine a state of tendons in the hand that corresponds to a keyboard activation input 62.

In other examples the keyboard activation input 62 may comprise the user 304 nodding, rotating, tilting otherwise moving his head in a predetermined manner. It will be appreciated that a variety of different gestures or other physical movements performed by the user 304 may be utilized as keyboard activation input 62 to trigger the display of the holographic keyboard image 308.

In some examples, the keyboard activation input 62 may comprise gaze tracking data from eye-tracking system 72. For example and with reference again to FIG. 3, the keyboard interface program 14 may display a virtual element, such as virtual text box 332, that accepts text input. Using gaze tracking data from the eye-tracking system 72, the keyboard interface program 14 may determine that user 304 is gazing at the virtual text box 332. For example, the keyboard interface program 14 may determine that user 304 is gazing at the virtual text box 332 for at least a predetermined period of time, such as 1 second, 2 seconds or any suitable period of time.

In some examples, the virtual text box 332 may be displayed in a body-lock display mode such that a location of the text box remains fixed relative to a location of user 304. In some examples, a body-lock display mode may comprise a torso-lock mode in which objects are positioned relative to the user's torso direction. For example, a torso-locked text box 332 might float in front of the user 304, allowing the user to tilt his head and look at the box from different angles. When the user 304 walks forward, the text box moves in the same direction to maintain a constant distance from the user's torso, and may also maintain a constant angular orientation relative to the user's torso.

In some examples, the body-lock display mode may comprise a head-lock mode in which the location of the virtual text box 332 follows movements of the user's head 350. Head-locked objects may be positioned relative to the user's face direction, such that a floating head-locked text box may float in front of the user's face at the same location and orientation relative to the face, regardless of movement or rotation of the user's head. A head-locked text box also may be fixed in a particular location relative to the user's view. For example, the text box may be displayed in a lower left corner of the user's view, and may be maintained in this corner of view regardless of the movement or orientation of the user's head 350. In this manner, the user 304 may conveniently look around the room 314 while the virtual text box 332 remains in view regardless of the orientation of the user's head 350.

In response to receiving the keyboard activation input 62, the keyboard interface program 14 may display the holographic keyboard image 308 and a holographic hand image 340 via television 312. More particularly and with reference also to FIG. 4, the keyboard interface program 14 may adaptively display the holographic keyboard image 308 in a virtual keyboard plane 400 and at a virtual distance 404 under the holographic hand image 340 representing the user's right hand 334. To display the holographic hand image 340, the keyboard interface program 14 may receive depth information via depth sensing cameras 324 of an initial actual position 348 of the user's right hand 334. Using the depth information, the holographic hand image 340 may be displayed in a virtual hand plane 408.

It will be appreciated that in some examples the holographic hand image 340 representing the user's right hand 334 may be generated using depth information and images of the user's hand to display a lifelike representation of the user's actual hand. In other examples the holographic hand image 340 representing the user's right hand 334 may comprise a generic hand image that is not based on the user's actual hand. In either example and as described in more detail below, depth information from depth sensing cameras 324 may be utilized to manipulate the holographic hand image 340 to mirror the hand motions of the user's actual hand.

As shown in FIG. 3, user 304 is standing with his hands hanging downwardly and comfortably at his side. By contrast, the holographic hand image 340 representing the user's right hand 334 is displayed generally upwardly with respect to user 304 and over the holographic keyboard image 308, with the back of the hand facing the user. For purposes of this disclosure, "generally upwardly" means a direction in which the knuckles of the holographic hand image 340 are above the wrist as viewed by the user in the holographic environment. While the example of FIG. 3 shows a holographic hand image 340 representing the user's right hand 334, it will be appreciated that in some examples a holographic hand image representing the user's left hand 330 may also be displayed. In other examples, a holographic hand image representing the user's left hand 330 may be displayed alone.

Advantageously, the holographic keyboard image 308 may be adaptively displayed and positioned underneath the holographic hand image 340 regardless of the actual position of the user's right hand 334. In this manner, the user 304 may immediately begin interacting with the holographic keyboard image 308 as soon as this image and the holographic hand image 340 are displayed. In some examples, the keyboard interface program 14 may optimize the relative positioning of the holographic hand image 340 over the holographic keyboard image 308. For example and as shown in FIG. 3, upon initial display of the holographic hand image 340 and holographic keyboard image 308, the index finger 344 of the holographic hand image may be positioned over the "J" key of the holographic keyboard image to provide a familiar starting position for typing.

Additionally, as the keyboard interface program 14 utilizes depth information of the actual position(s) of the user's right hand 334 and/or left hand 330, interface program 14 may enable user 304 to assume a variety of positions other than standing, while still comfortably interacting with the holographic keyboard image 308. In various examples, the user 304 may sit in a variety of positions, lay prone such as on a couch, or assume any other comfortable bodily position in which his hands are within a field of view of the depth cameras 324. As mentioned above, regardless of the actual position of the user's hand(s), the keyboard interface program 14 adaptively displays the holographic keyboard image 308 at a virtual distance 404 under the holographic hand image 340.

With reference again to the example of FIG. 3, the holographic keyboard image 308 may be displayed such that its long side 352 extends horizontally and substantially parallel to an X-axis of the user 304. In some examples, the X-axis is defined as being substantially parallel to a line bisecting the user's two eyes (not shown). Additionally, the keyboard interface program 14 may be configured to maintain the long side 352 of the holographic keyboard image 308 substantially parallel to the X-axis of the user 304, regardless of the orientation of the user's head 350. In this manner, the keyboard interface program 14 may further enable user 304 to assume a variety of positions while still comfortably interacting with the holographic keyboard image 308.

In some examples, the holographic hand image 340 and holographic keyboard image 308 may appear when the keyboard activation input 62 is received from user 304. In other examples, the holographic keyboard image 308 may appear when the keyboard activation input 62 is received, while the holographic hand image 340 may be displayed when a hand image trigger is received. In some examples, the hand image trigger may comprise the user's right hand 334 being maintained in a substantially constant position for a predetermined length of time, such as 0.5 seconds for example.

In other examples and depending upon an application being utilized, holographic keyboard image 308 may be continuously displayed regardless of whether keyboard activation input 62 has been received. For example, where user 304 is utilizing a word processing application, the holographic keyboard image 308 may be continuously displayed. In these examples, upon receiving a keyboard activation input 62 the position of the holographic keyboard image 308 may be adjusted to the virtual keyboard plane 400 that is at the virtual distance 404 from the holographic hand image 340.

Figure 4:
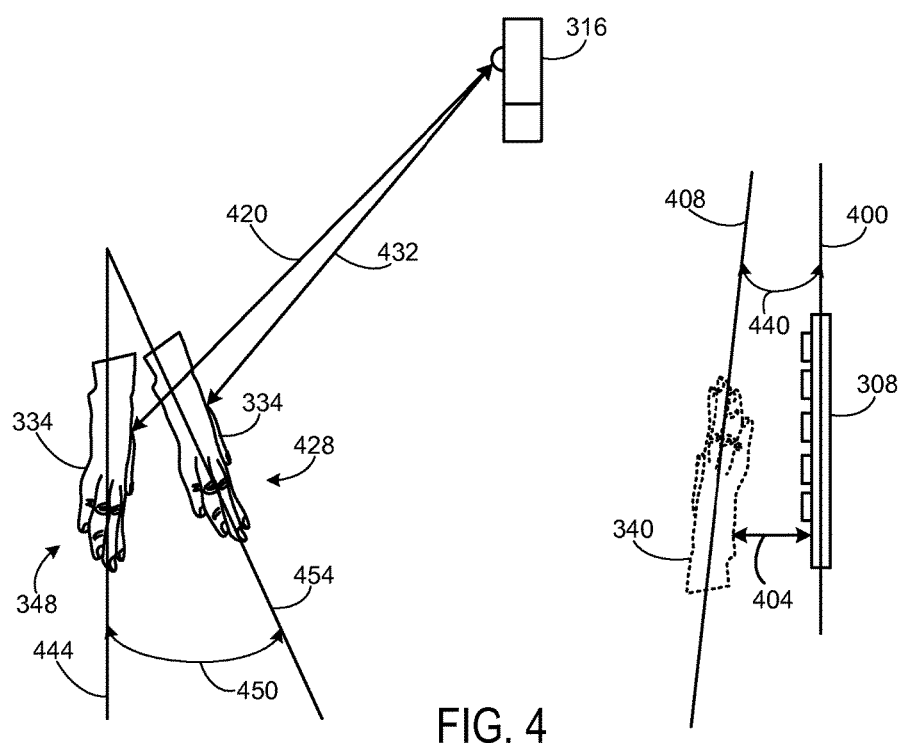
FIG. 4 is a schematic side view of the user's hand of FIG. 3 and the corresponding holographic hand image and holographic keyboard image according to an embodiment of the present disclosure.

With reference now to FIG. 4, in some examples the keyboard interface program 14 may determine that the user's hand 334 in the initial actual position 348 is spaced by an initial actual distance 420 from the set-top box 316 comprising the depth cameras 324 that provide depth information. As shown in FIG. 4, with the user's hand 334 in the initial actual position 348, the holographic keyboard image 308 is displayed at the virtual distance 404 under the holographic hand image. The keyboard interface program 14 then may determine that the user's hand 334 moves to an updated actual position 428 that is an updated actual distance 432 from the set-top box 316. In this example, the updated actual distance 432 is less than the initial actual distance 420. In other examples, the updated actual distance 432 may be greater than the initial actual distance 420.

In response to determining that the user's hand 334 moves to the updated actual distance 432 from the set-top box 316, the keyboard interface program 14 may be configured to maintain the holographic keyboard image 308 at substantially the virtual distance 404 under the holographic hand image 340 representing the user's hand. In this manner, the keyboard interface program 14 advantageously provides a consistent user interaction experience by allowing the user's hand 334 to drift or move while maintaining the holographic keyboard image 308 at a substantially constant distance under the holographic hand image 340. Also and as noted above, this further enables the user 304 to change the location and/or orientation of his body and/or hands while maintaining the holographic keyboard image 308 at a consistent distance under the holographic hand image 340.

As schematically illustrated in the example of FIG. 4, the virtual hand plane 408 of the holographic hand image 340 may form an interaction angle 440 with the virtual keyboard plane 400 of the holographic keyboard image 308. In various examples, the interaction angle 440 may be 0 degrees, 5 degrees, 10 degrees, or any other suitable angle. As the user's hand 334 changes position, the keyboard interface program 14 may determine that an initial actual plane 444 of the user's hand changes by a rotation angle 450 to an updated actual plane 454.

Advantageously, and in response to determining that the initial actual plane 444 changes by the rotation angle 450 to the updated actual plane 454, the keyboard interface program 14 may substantially maintain the interaction angle 440 between the virtual hand plane 408 of the holographic hand image 340 and the virtual keyboard plane 400 of the holographic keyboard image 308. In this manner, the keyboard interface program 14 further facilitates a consistent user interaction experience by allowing the user's hand 334 to drift or move while maintaining a substantially constant interaction angle 440 between the virtual hand plane 408 and the virtual keyboard plane 400 of the holographic keyboard image 308.

Figure 5:
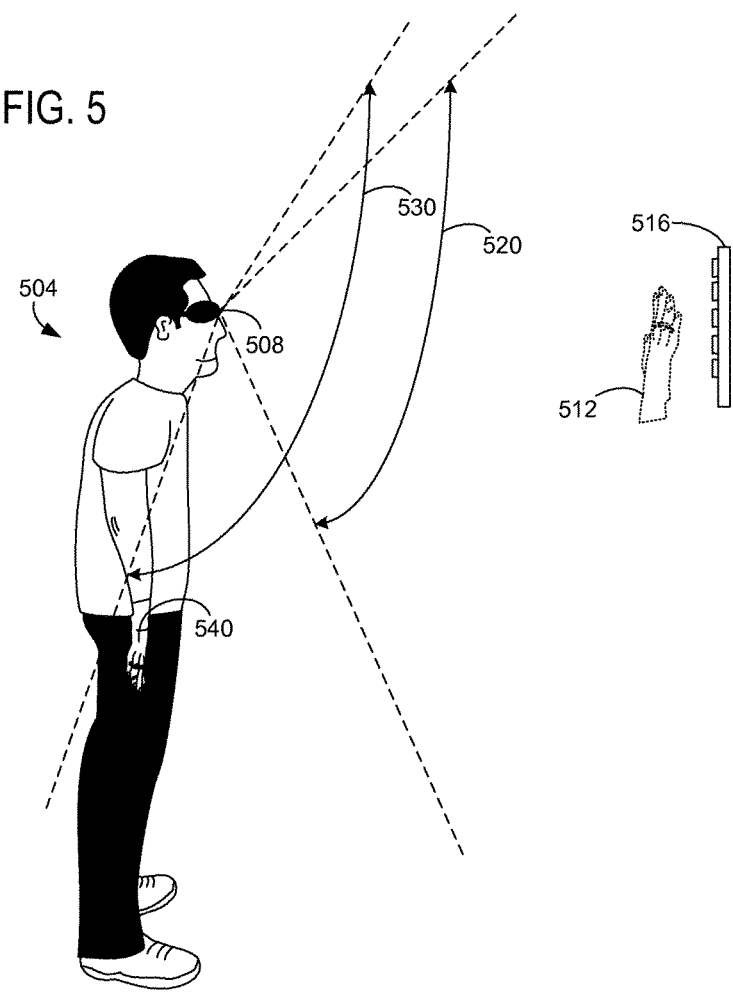
FIG. 5 is schematic side view of a user wearing a head-mounted display device and interacting with a holographic hand image and a holographic keyboard image according to an embodiment of the present disclosure.

With reference now to FIG. 5, a schematic side view of a user 504 wearing an HMD device 508 and interacting with a holographic hand image 512 and a holographic keyboard image 516 is provided. A display system 64 of the HMD device 508 may have a display field of view 520 in which the holographic hand image 512, holographic keyboard image 516 and other images may be displayed to the user 504. The HMD device 508 may also have an optical sensor system 76 including one or more depth sensors having a capture field of view 530 within which the sensors may capture depth information.

As shown in FIG. 5, with the user 504 allowing his hand 540 to rest comfortably by his side, the user's hand is located outside of the display field of view 520 of the HMD device 508 but within the capture field of view 530 of the depth sensors of the HMD device. Advantageously, in this manner the keyboard interface program 14 enables the user 504 to stand in a relaxed position with his hands by his side and interact with the holographic keyboard image 516 via holographic hand image 512 as described above.

In some examples, the keyboard interface program 14 may be configured to display one or more virtual shadows on a holographic keyboard image below one or more holographic hand images to provide a visual location cue of the virtual distance between the holographic hand image and the holographic keyboard image. For example and with reference now to FIGS. 6 and 7, in one example a holographic left hand image 602 may be displayed over a holographic keyboard image 606 and positioned such that a fingertip 610 of the index finger 614 of the hand image is located over a holographic control key 618 of the keyboard image. As described above, the holographic left hand image 602, index finger 614 and fingertip 610 correspond to an orientation of the physical left hand, index finger and fingertip of a user, such as user 304.

Figure 7:
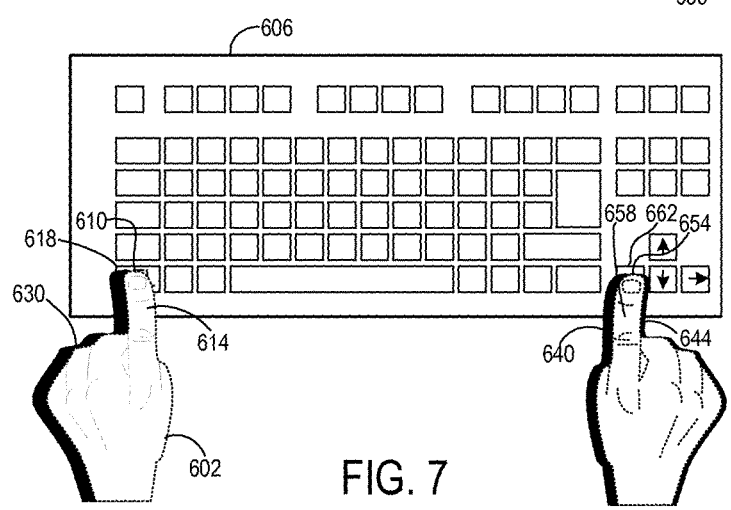
FIG. 7 is a schematic view of the holographic keyboard of FIG. 6 showing the two holographic hand images at a closer virtual distance to the holographic keyboard according to an embodiment of the present disclosure.

To provide the user with a visual location cue of the virtual distance between the holographic left hand image 602 and the holographic keyboard image 606, the keyboard interface program 14 may display a left hand virtual shadow 630 on the holographic keyboard image and underneath the left hand image. With reference now to FIG. 7, as the user moves her physical left hand to cause the holographic fingertip 610 to advance toward the holographic control key 618, the left hand virtual shadow 630 may be correspondingly moved under the holographic left hand image 602 to visually converge with the left hand image. In this manner, the user receives a visual location cue that the holographic fingertip 610 is advancing towards the holographic control key 618.

Figure 6:
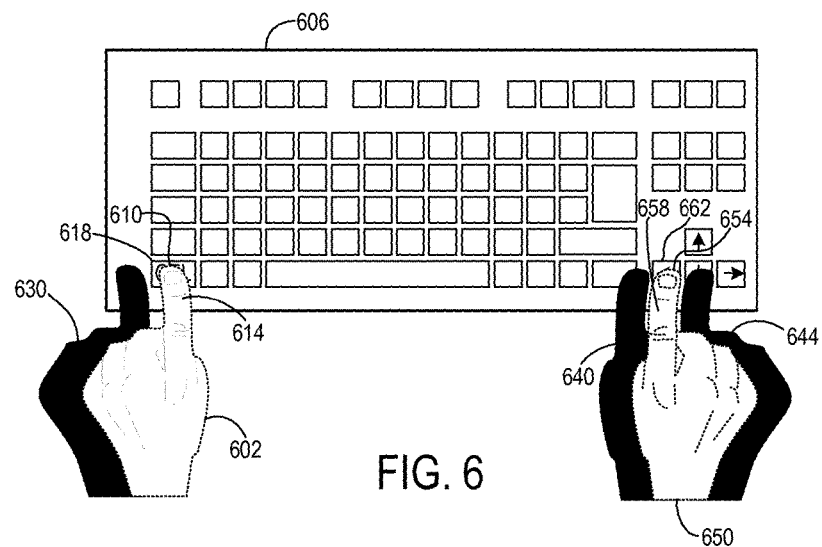
FIG. 6 is a schematic view of a holographic keyboard positioned below two holographic hand images according to an embodiment of the present disclosure.

In another example and as shown in FIG. 6, a first right hand shadow 640 and second right hand shadow 644 may be utilized to provide a visual location cue of the virtual distance between a holographic right hand image 650 and the holographic keyboard image 606. In this example, the holographic right hand image 650 is displayed over the holographic keyboard image 606 and positioned such that a fingertip 654 of index finger 658 is located over a holographic arrow key 662 of the keyboard image. As described above, the holographic right hand image 650, index finger 658 and fingertip 654 correspond to an orientation of the physical right hand, index finger and fingertip of a user, such as user 304.

In this example and with reference now to FIG. 7, the user may move her physical right hand to cause the holographic fingertip 654 to advance toward the holographic arrow key 662. Corresponding to this movement, the first right hand shadow 640 and second right hand shadow 644 may be moved towards one another under the holographic right hand image 650 to visually converge at the holographic arrow key 662. In this manner, the user receives a visual location cue that the holographic fingertip 654 is advancing towards the holographic arrow key 662.

In other examples and with reference again to FIG. 6, the keyboard interface program 14 may determine that holographic fingertip 610 of the holographic left hand image 602 is located over the holographic control key 618. In response, the holographic interface program 14 may broadcast one or more audio location cues that indicate to a user that a holographic fingertip is located over a holographic key of the holographic keyboard image 606. In this manner, the user may be assisted in manipulating a holographic fingertip to select a desired holographic key.

With reference now to FIG. 8A and in other examples, the keyboard interface program 14 may animate one or more holographic keys of a holographic keyboard to facilitate a user's interaction with the keyboard via a holographic hand image. As schematically shown in FIG. 8A, the keyboard interface program 14 may display a holographic right hand image 802 that corresponds to a user's physical right hand as discussed above. In this example and to match an orientation of the user's physical right hand, the holographic right hand image 802 forms a pointing gesture in which the holographic index finger 806 is extended. As shown in FIG. 8A, the index fingertip 810 is located over a selected holographic key 814 of a holographic keyboard image 818. FIG. 8B schematically illustrates the actual index finger 822 and actual index fingertip 826 of the user's physical right hand which are modeled by the holographic index finger 806 and index fingertip 810 of FIG. 8A.

In some examples, the keyboard interface program 14 may determine that the holographic index fingertip 810 of the holographic hand image 802 is located over the selected holographic key 814 of the holographic keyboard image 818. With reference now to FIG. 9A, and in response to determining that the holographic index fingertip 810 is located over the selected holographic key 814, the keyboard interface program 14 may animate the holographic key to extend outwardly toward the holographic fingertip and to an extended position 820. In some examples the holographic key 814 may be extended to touch the holographic fingertip 810. Advantageously, in this manner the user may visually perceive the holographic key 814 touching the holographic fingertip 810 of the extended holographic index finger 806. In other examples, the holographic key 814 may be moved outwardly toward the holographic fingertip 810 but may not touch the holographic fingertip. As shown in FIG. 9B, during this animation the user's actual index finger 822 may remain substantially stationary.

With reference now to FIG. 10B, the user may desire to select the selected holographic key 814. Accordingly, the user may move the physical fingertip 826 of his index finger 822 in a key-press direction, as indicated by action arrow K, by an actual key-press distance 830. Correspondingly, and in response to determining that the physical fingertip 826 moves in key-press direction K by actual key-press distance 830, the keyboard interface program 14 may animate the holographic fingertip 810 and the holographic key 814 to move toward the holographic keyboard image 818 by a virtual key-press distance 840 that is less than the actual key-press distance 830.

Advantageously, by selectively moving the holographic fingertip 810 and holographic key 814 by a virtual key-press distance 840 that is less than the actual key-press distance 830, the keyboard interface program 14 may visually simulate haptic friction between the holographic key and the holographic keyboard. Alternatively expressed, by truncating the visual movement of the holographic fingertip 810 and holographic key 814 as compared to the actual movement of the user's fingertip 826, the keyboard interface program 14 visually simulates the holographic key 814 contacting an obstacle within the holographic keyboard image 818 that stops movement of the key. In some examples, once movement of the holographic key 814 has ceased, the holographic index finger 806 may be animated to continue rotating around the point of contact between the fingertip 810 and the key. Advantageously, such visual simulations may provide the user with a perception of the selection of the key in a manner similar to the tactile interaction provided by the keys of a physical keyboard.

Figure 11C:
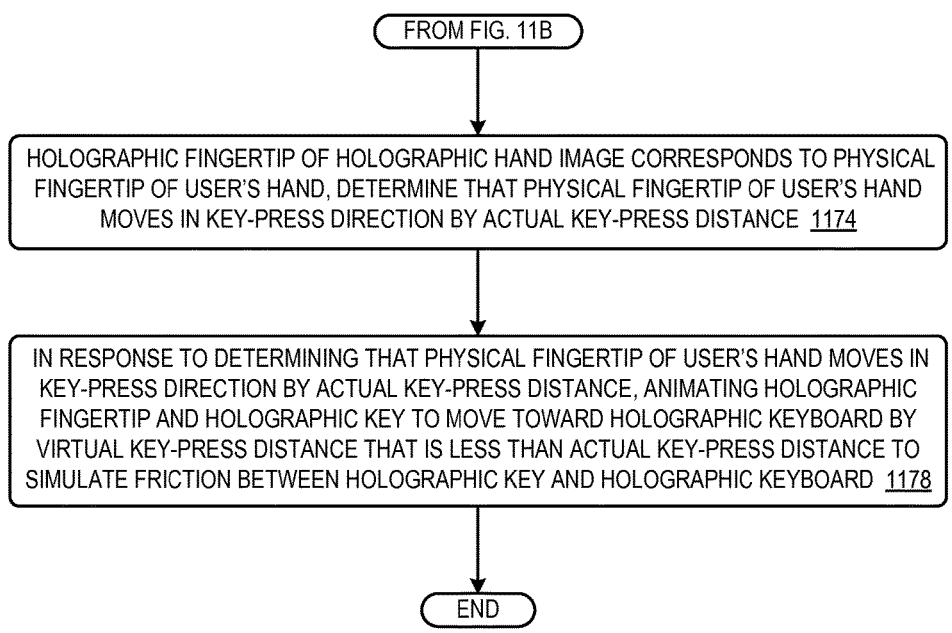

FIGS. 11A, 11B, and 11C illustrate a flow chart of a method 1100 for method for displaying a holographic keyboard image and a holographic hand image representing a user's hand in a holographic environment according to an embodiment of the present disclosure. The following description of method 1100 is provided with reference to the software and hardware components of the keyboard interface system 10 described above and shown in FIGS. 1-10. It will be appreciated that method 1100 may also be performed in other contexts using other suitable hardware and software components.

With reference now to FIG. 11A, at 1104 the method 100 may include receiving depth information of an actual position of a user's hand. At 1108 the method 1100 may include, using the depth information, displaying the holographic hand image representing the user's hand in a virtual hand plane in the holographic environment. At 1112 the method 1100 may include receiving a keyboard activation input from the user. At 1116 the method 1100 may include displaying a virtual element that accepts text input. At 1120 the method 1100 may include receiving a keyboard activation input by determining that the user is gazing at the virtual element. At 1124 the keyboard activation input may comprise audio input from the user.

At 1128, in response to receiving the keyboard activation input and using the depth information of the actual position of the user's hand, the method 1100 may include adaptively displaying the holographic keyboard image in a virtual keyboard plane in the holographic environment at a virtual distance under the holographic hand image representing the user's hand. At 1132 the method 1100 may include determining that the user's hand is spaced by an initial actual distance from a capture device that provides the depth information. At 1136 the method 1100 may include determining that the user's hand moves to an updated actual distance from the capture device. At 1140 the method 1100 may include, in response to determining that the user's hand moves to the updated actual distance from the capture device, maintaining the holographic keyboard image at substantially the virtual distance under the holographic hand image representing the user's hand.

With reference now to FIG. 11B, at 1144 the virtual hand plane of the holographic hand image may form an interaction angle with the virtual keyboard plane of the holographic keyboard image. At 1148 the method 1100 may include determining that an initial actual plane of the user's hand changes by a rotation angle to an updated actual plane. At 1152, in response to determining that the initial actual plane changes by the rotation angle to the updated actual plane, the method 1100 may include substantially maintaining the interaction angle between the virtual hand plane of the holographic hand image and the virtual keyboard plane of the holographic keyboard image.

At 1156 the actual position of the user's hand may be outside a display field of view of a display system that displays the holographic keyboard image and the holographic hand image, and the actual position of the user's hand may be within a capture field of view of a capture device that provides the depth information. At 1158 the method 1100 may include displaying one or more virtual shadows on the holographic keyboard image below the holographic hand image to provide a visual location cue of the virtual distance between the holographic hand image and the holographic keyboard image.

At 1162 the method 1100 may include determining that a holographic fingertip of the holographic hand image is located over a holographic key of the holographic keyboard image. At 1166, in response to determining that the holographic fingertip is located over the holographic key, the method 1100 may include broadcasting one or more audio location cues to the user. At 1170, in response to determining that the holographic fingertip is located over the holographic key, the method 1100 may include animating the holographic key to extend outwardly toward the holographic fingertip.

With reference now to FIG. 11C, where a holographic fingertip of the holographic hand image corresponds to a physical fingertip of the user's hand, at 1174 the method 1100 may include determining that the physical fingertip of the user's hand moves in a key-press direction by an actual key-press distance. At 1178, in response to determining that the physical fingertip moves in the key-press direction, the method 1100 may include animating the holographic fingertip and the holographic key to move toward the holographic keyboard by a virtual key-press distance that is less than the actual key-press distance to simulate friction between the holographic key and the holographic keyboard.

It will be appreciated that method 1100 is provided by way of example and is not meant to be limiting. Therefore, it is to be understood that method 1100 may include additional and/or alternative steps than those illustrated in FIGS. 11A, 11B and 11C. Further, it is to be understood that method 1100 may be performed in any suitable order. Further still, it is to be understood that one or more steps may be omitted from method 1100 without departing from the scope of this disclosure.

Figure 12:
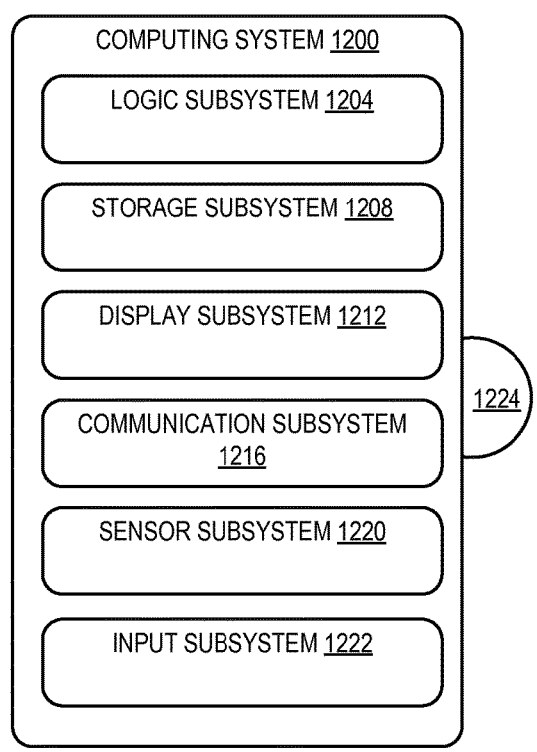
FIG. 12 is a simplified schematic illustration of an embodiment of a computing system.

FIG. 12 schematically shows a nonlimiting embodiment of a computing system 1200 that may perform one or more of the above described methods and processes. Computing device 22 may take the form of computing system 1200. Computing system 1200 is shown in simplified form. It is to be understood that virtually any computer architecture may be used without departing from the scope of this disclosure. In different embodiments, computing system 1200 may take the form of a mainframe computer, server computer, desktop computer, laptop computer, tablet computer, home entertainment computer, network computing device, mobile computing device, mobile communication device, gaming device, etc. As noted above, in some examples the computing system 1200 may be integrated into an HMD device.

As shown in FIG. 12, computing system 1200 includes a logic subsystem 1204 and a storage subsystem 1208. Computing system 1200 may optionally include a display subsystem 1212, a communication subsystem 1216, a sensor subsystem 1220, an input subsystem 1222 and/or other subsystems and components not shown in FIG. 12. Computing system 1200 may also include computer readable media, with the computer readable media including computer readable storage media and computer readable communication media. Computing system 1200 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1204 may include one or more physical devices configured to execute one or more instructions. For example, the logic subsystem 1204 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1204 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1208 may include one or more physical, persistent devices configured to hold data and/or instructions executable by the logic subsystem 1204 to implement the herein described methods and processes. When such methods and processes are implemented, the state of storage subsystem 1208 may be transformed (e.g., to hold different data).

Storage subsystem 1208 may include removable media and/or built-in devices. Storage subsystem 1208 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1208 may include devices with one or more of the following characteristics: volatile, nonvolatile, dynamic, static, read/write, read-only, random access, sequential access, location addressable, file addressable, and content addressable.

In some embodiments, aspects of logic subsystem 1204 and storage subsystem 1208 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 12 also shows an aspect of the storage subsystem 1208 in the form of removable computer readable storage media 1224, which may be used to store data and/or instructions executable to implement the methods and processes described herein. Removable computer-readable storage media 1224 may take the form of CDs, DVDs, HD-DVDs, Blu-Ray Discs, EEPROMs, and/or floppy disks, among others.

It is to be appreciated that storage subsystem 1208 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 1212 may be used to present a visual representation of data held by storage subsystem 1208. As the above described methods and processes change the data held by the storage subsystem 1208, and thus transform the state of the storage subsystem, the state of the display subsystem 1212 may likewise be transformed to visually represent changes in the underlying data. The display subsystem 1212 may include one or more display devices utilizing virtually any type of technology. Such display devices may be combined with logic subsystem 1204 and/or storage subsystem 1208 in a shared enclosure, or such display devices may be peripheral display devices. The display subsystem 1212 may include, for example, the display system 64 and transparent display 68 of the HMD device 54.

When included, communication subsystem 1216 may be configured to communicatively couple computing system 1200 with one or more networks and/or one or more other computing devices. Communication subsystem 1216 may include wired and/or wireless communication devices compatible with one or more different communication protocols. As nonlimiting examples, the communication subsystem 1216 may be configured for communication via a wireless telephone network, a wireless local area network, a wired local area network, a wireless wide area network, a wired wide area network, etc. In some embodiments, the communication subsystem may allow computing system 1200 to send and/or receive messages to and/or from other devices via a network such as the Internet.

When included, sensor subsystem 1220 may include one or more sensors configured to sense different physical phenomenon (e.g., visible light, infrared light, sound, acceleration, orientation, position, etc.) as described above. Sensor subsystem 1220 may be configured to provide sensor data to logic subsystem 1204, for example. As described above, such data may include depth information, eye-tracking information, image information, audio information, ambient lighting information, position information, motion information, user location information, and/or any other suitable sensor data that may be used to perform the methods and processes described above.

When included, input subsystem 1222 may comprise or interface with one or more sensors or user-input devices such as a game controller, gesture input detection device, voice recognizer, inertial measurement unit, keyboard, mouse, or touch screen. In some embodiments, the input subsystem 1222 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the keyboard interface system 10 that is implemented to perform one or more particular functions. In some cases, such a program may be instantiated via logic subsystem 1204 executing instructions held by storage subsystem 1208. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for displaying a holographic keyboard image and a holographic hand image representing a user's hand in a holographic environment, the method comprising:
   receiving depth information of an actual position of the user's hand;
   determining that the user's hand is spaced by an initial actual distance from a capture device that provides the depth information;
   using the depth information, displaying the holographic hand image representing the user's hand in a virtual hand plane in the holographic environment;
   receiving a keyboard activation input from the user;
   in response to receiving the keyboard activation input, and using the depth information of the actual position of the user's hand, adaptively displaying in a virtual keyboard plane the holographic keyboard image spatially separated by a virtual distance from the holographic hand image representing the user's hand in the holographic environment;
   determining that the user's hand moves to an updated actual distance from the capture device; and
   in response to determining that the user's hand moves to the updated actual distance from the capture device, maintaining the holographic keyboard image spatially separated by substantially the virtual distance from the holographic hand image representing the user's hand.

2. The method of claim 1, wherein the virtual hand plane of the holographic hand image forms an interaction angle with the virtual keyboard plane of the holographic keyboard image, the method further comprising:
   determining that an initial actual plane of the user's hand changes by a rotation angle to an updated actual plane; and in response to determining that the initial actual plane changes by the rotation angle to the updated actual plane, substantially maintaining the interaction angle between the virtual hand plane of the holographic hand image and the virtual keyboard plane of the holographic keyboard image.

3. The method of claim 1, further comprising:
displaying a virtual element that accepts text input; and
wherein receiving the keyboard activation input further comprises determining that the user is gazing at the virtual element.

4. The method of claim 1, wherein the keyboard activation input comprises audio input from the user.

5. The method of claim 1, wherein the actual position of the user's hand is outside a display field of view of a display system that displays the holographic keyboard image and the holographic hand image, and the actual position of the user's hand is within a capture field of view of a capture device that provides the depth information.

6. The method of claim 1, further comprising:
displaying one or more virtual shadows on the holographic keyboard image below the holographic hand image to provide a visual location cue of the virtual distance between the holographic hand image and the holographic keyboard image.

7. The method of claim 1, further comprising:
determining that a holographic fingertip of the holographic hand image is located over a holographic key of the holographic keyboard image; and
in response to determining that the holographic fingertip is located over the holographic key, animating the holographic key to extend outwardly toward the holographic fingertip.

8. The method of claim 1, wherein a holographic fingertip of the holographic hand image corresponds to a physical fingertip of the user's hand, the method further comprising:
determining that the holographic fingertip is located over a holographic key of the holographic keyboard image;
determining that the physical fingertip of the user's hand moves in a key-press direction by an actual key-press distance;
in response to determining that the physical fingertip moves in the key-press direction, animating the holographic fingertip and the holographic key to move toward the holographic keyboard by a virtual key-press distance that is less than the actual key-press distance to simulate friction between the holographic key and the holographic keyboard.

9. The method of claim 1, further comprising:
determining that a holographic fingertip of the holographic hand image is located over a holographic key of the holographic keyboard image; and
in response to determining that the holographic fingertip of the holographic hand image is located over the holographic key of the holographic keyboard image, broadcasting one or more audio location cues.

10. A keyboard interface system for displaying a holographic keyboard image and a holographic hand image representing a user's hand in a holographic environment, the keyboard interface system comprising:
a display system;
a keyboard interface program executed by a processor of a computing device, the keyboard interface program configured to:
receive depth information of an actual position of the user's hand;
determine that the user's hand is spaced by an initial actual distance from a capture device that provides the depth information;
using the depth information, display via the display system the holographic hand image representing the user's hand in a virtual hand plane in the holographic environment;
receive a keyboard activation input from the user;
in response to receiving the keyboard activation input, and using the depth information of the actual position of the user's hand, adaptively display via the display system in a virtual keyboard plane the holographic keyboard image spatially separated by a virtual distance from the holographic hand image representing the user's hand in the holographic environment;
determine that the user's hand moves to an updated actual distance from the capture device; and
in response to determining that the user's hand moves to the updated actual distance from the capture device, maintain the holographic keyboard image spatially separated by substantially the virtual distance from the holographic hand image representing the user's hand.

11. The keyboard interface system of claim 10, wherein the keyboard interface program is further configured to:
determine that the user's hand is spaced by an initial actual distance from a capture device that provides the depth information;
determine that the user's hand moves to an updated actual distance from the capture device; and
in response to determining that the user's hand moves to the updated actual distance from the capture device, maintain the holographic keyboard image spatially separated by substantially the virtual distance from the holographic hand image representing the user's hand.

12. The keyboard interface system of claim 10, wherein the virtual hand plane of the holographic hand image forms an interaction angle with the virtual keyboard plane of the holographic keyboard image, and the keyboard interface program is further configured to:
determine that an initial actual plane of the user's hand changes by a rotation angle to an updated actual plane; and
in response to determining that the initial actual plane changes by the rotation angle to the updated actual plane, substantially maintain the interaction angle between the virtual hand plane of the holographic hand image and the virtual keyboard plane of the holographic keyboard image.

13. The keyboard interface system of claim 10, wherein the keyboard interface program is further configured to:
display a virtual element that accepts text input; and
wherein receiving the keyboard activation input further comprises determining that the user is gazing at the virtual element.

14. The keyboard interface system of claim 10, further comprising a capture device that captures the depth information, and wherein the actual position of the user's hand is outside a display field of view of the display system, and the actual position of the user's hand is within a capture field of view of the capture device.

15. The keyboard interface system of claim 14, wherein the display system, the computing device, and the capture device are located on a head-mounted display device.

16. The keyboard interface system of claim 10, wherein the keyboard interface program is further configured to:

determine that a holographic fingertip of the holographic hand image is located over a holographic key of the holographic keyboard image; and in response to determining that the holographic fingertip is located over the holographic key, animate the holographic key to extend outwardly toward the holographic fingertip.

17. The keyboard interface system of claim 10, wherein a holographic fingertip of the holographic hand image corresponds to a physical fingertip of the user's hand, and the keyboard interface program is further configured to:

determine that the holographic fingertip is located over a holographic key of the holographic keyboard image;

determine that the physical fingertip of the user's hand moves in a key-press direction by an actual key-press distance; and in response to determining that the physical fingertip moves in the key-press direction, animate the holographic fingertip and the holographic key to move toward the holographic keyboard by a virtual key-press distance that is less than the actual key-press distance to simulate friction between the holographic key and the holographic keyboard.

18. The keyboard interface system of claim 10, wherein the keyboard interface program is further configured to:

determine that a holographic fingertip of the holographic hand image is located over a holographic key of the holographic keyboard image; and in response to determining that a holographic fingertip of the holographic hand image is located over a holographic key of the holographic keyboard image, broadcast one or more audio location cues.

19. A head-mounted display device, comprising:

a display system;

a computing device; and a keyboard interface program executed by a processor of the computing device, the keyboard interface program configured to:

receive depth information of an actual position of the user's hand;

determine that the user's hand is spaced by an initial actual distance from a capture device that provides the depth information;

using the depth information, display via the display system the holographic hand image representing the user's hand in a virtual hand plane in the holographic environment;

receive a keyboard activation input from the user;

in response to receiving the keyboard activation input, and using the depth information of the actual position of the user's hand, adaptively display via the display system in a virtual keyboard plane the holographic keyboard image spatially separated by a virtual distance from the holographic hand image representing the user's hand in the holographic environment, wherein the virtual hand plane of the holographic hand image forms an interaction angle with the virtual keyboard plane of the holographic keyboard image;

determine that the user's hand moves to an updated actual distance from the capture device;

in response to determining that the user's hand moves to the updated actual distance from the capture device, maintain the holographic keyboard image spatially separated by substantially the virtual distance from the holographic hand image representing the user's hand;

determine that an initial actual plane of the user's hand changes by a rotation angle to an updated actual plane; and in response to determining that the initial actual plane changes by the rotation angle to the updated actual plane, substantially maintain the interaction angle between the virtual hand plane of the holographic hand image and the virtual keyboard plane of the holographic keyboard image.

\* \* \* \* \*